Patented Mar. 24, 1925.

1,530,769

UNITED STATES PATENT OFFICE.

JOSEPH E. HAMBY, OF LAVERNE, OKLAHOMA, ASSIGNOR TO WELBORN TRACTOR COMPANY, OF KANSAS CITY, MISSOURI, A CORPORATION OF DELAWARE.

BATTERY-REGENERATING ELECTROLYTE.

No Drawing. Application filed November 21, 1921. Serial No. 516,863.

*To all whom it may concern:*

Be it known that I, JOSEPH E. HAMBY, a citizen of the United States, residing at Laverne, in the county of Harper and State of Oklahoma, have invented certain new and useful Improvements in Battery-Regenerating Electrolytes; and I do declare the following to be a full, clear, and exact description of the invention, such as will enable others skilled in the art to which it appertains to make and use the same.

This invention relates to an electrolyte for secondary batteries and the primary object of the invention is to provide a desulphating electrolyte which will energize the active material in the plates of the battery and by desulphation permit the battery to give off its energy without recourse to a charging electric current.

Ordinarily secondary batteries must, in order to render them active, be subjected to the action of an electric current from a suitable source of supply, which is generally termed the charging current. The current produces agitation or activity in the battery and when recharging, desulphates the grids or plates so that the battery is again ready for use.

The period during which the charging current must pass through the battery is relatively long so of necessity the battery is out of active commission for the greater part of its life.

I have provided an electrolyte which is particularly applicable for regenerating or restoring the batteries to activity without the necessity of employing electric current and the characteristics of the electrolyte are such that it will render a discharged battery ready for use within a relatively short time after the battery has been treated.

The electrolyte is in the form of a solution and consists of water, glycerine, bicarbonate of soda and sulphuric acid, the proportions varying with different conditions but in order that the nature of the invention can be thoroughly understood, I will describe the method for a given quantity and for an acid of a particular specific gravity.

Suppose, for example, the available sulphuric acid solution is about 1.500 specific gravity. This would be diluted to about 1.100 specific gravity as indicated by a Baumé hydrometer. Then glycerine and bicarbonate of soda would be added and the mixture stirred or agitated until the bicarbonate of soda was in solution. Then enough acid will be added to bring the specific gravity up to between 1.275 to 1.325, this being the range within which the electrolyte appears to be most effective. The battery would then be washed with water, preferably distilled water, to free it of any removable extraneous matter and then the electrolyte would be poured into the battery box. In a comparatively short time, less than ten minutes ordinarily, the battery is ready for use, although in some cases a longer period is required.

The bicarbonate of soda seems to be an active agent in desulphating the sulphuric acid performing its usual function as an electrolyte and the glycerine will form an evaporation-resisting film over the body of liquid within the box so as to form a liquid seal to retard evaporation of the electrolyte.

It is important that the acidity of the mixing solution be sufficient to cut the bicarbonate of soda and yet weak enough to dissolve the glycerine.

I have found in actual practice that the regenerating and desulphating fluid which conforms to my invention will be an active energizer of batteries without any ill effect to the battery plates in excess of what would take place under ordinary conditions. By introducing the solution into the battery box I am enabled to restore the batteries to their original or nearly their original strength without recharging with an electric current so the active life of the battery is materially increased because it is not required that the battery be put out of commission for long periods of time for recharging.

When the specific gravity of the acidulated water is about 1.100 it is best adapted for the dissolving of the glycerine and the acid, and then enough acid can be added to bring the specific gravity to some point between 1.275 and 1.325, at which time the electrolyte is ready for use.

In actual practice I have found that after the electrolyte is in the battery box, a thin film of glycerine will float to the top; not all of the glycerine but just a film sufficient to prevent evaporation of the electrolyte, and this I consider an important feature of the invention.

As a specific example of the compounding of the proportions of the ingredients, the following may be given: Sulphuric acid should be reduced to 1.150 by adding distilled water. To a gallon of this product should be added one ounce of glycerine and two ounces of bicarbonate of soda. These proportions serve admirably in warm weather. In cold weather a gallon of the same specific gravity sulphuric acid may be used to which should be added two ounces of glycerine and four ounces of bicarbonate of soda.

What I claim and desire to secure by Letters-Patent is:

An electrolyte for secondary batteries consisting of sulphuric acid, water, bicarbonate of soda, and glycerine.

In testimony whereof I affix my signature.

JOSEPH E. HAMBY.